3 Sheets—Sheet 1.

W. W. DOOLITTLE.

COLLAPSIBLE TAP.

No. 11,359. Reissued Aug. 15, 1893.

Witnesses,
W. C. Corlies
S. W. Brainard.

Inventor,
William W. Doolittle,
By Coburn & Thacher
Attys.

3 Sheets—Sheet 2.

W. W. DOOLITTLE.

COLLAPSIBLE TAP.

No. 11,359. Reissued Aug. 15, 1893.

Witnesses,
W. C. Corlies
S. N. Brainard.

Inventor,
William W. Doolittle,
By Coburn & Thacher
Attys.

W. W. DOOLITTLE.

COLLAPSIBLE TAP.

No. 11,359. Reissued Aug. 15, 1893.

Witnesses.
N. C. Collier
S. W. Brainard.

Inventor.
William W. Doolittle.
By Coburn & Thacher
Attys.

UNITED STATES PATENT OFFICE.

WILLIAM W. DOOLITTLE, OF CHICAGO, ILLINOIS, ASSIGNOR TO THE CRANE COMPANY, OF SAME PLACE.

COLLAPSIBLE TAP.

SPECIFICATION forming part of Reissued Letters Patent No. 11,359, dated August 15, 1893.

Original No. 481,648, dated August 30, 1892. Application for reissue filed January 3, 1893. Serial No. 457,188.

*To all whom it may concern:*

Be it known that I, WILLIAM W. DOOLITTLE, a citizen of the United States, residing at Chicago, in the county of Cook and State of Illinois, have invented certain new and useful Improvements in Collapsible Taps, which are fully set forth in the following specification, reference being had to the accompanying drawings, in which—

Figure 1:
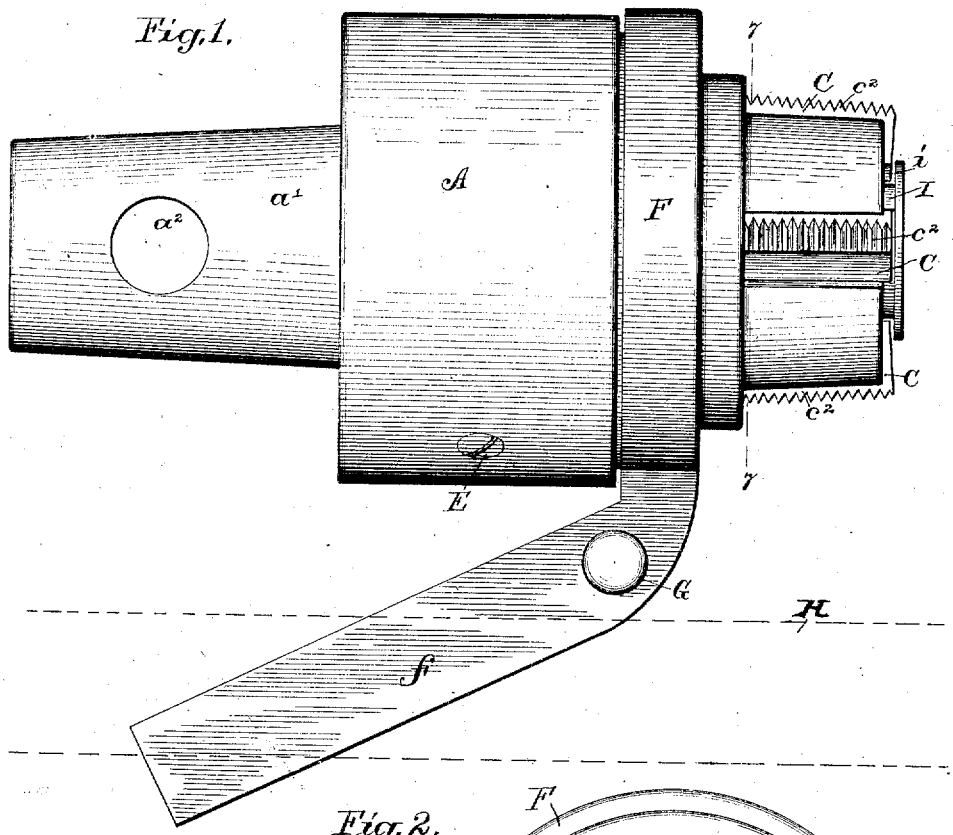
Figure 2:
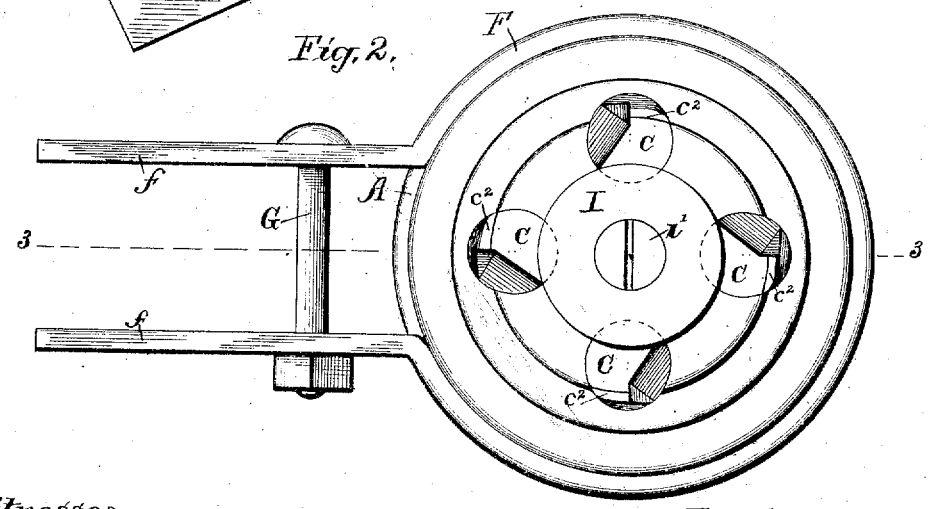
Figure 3:
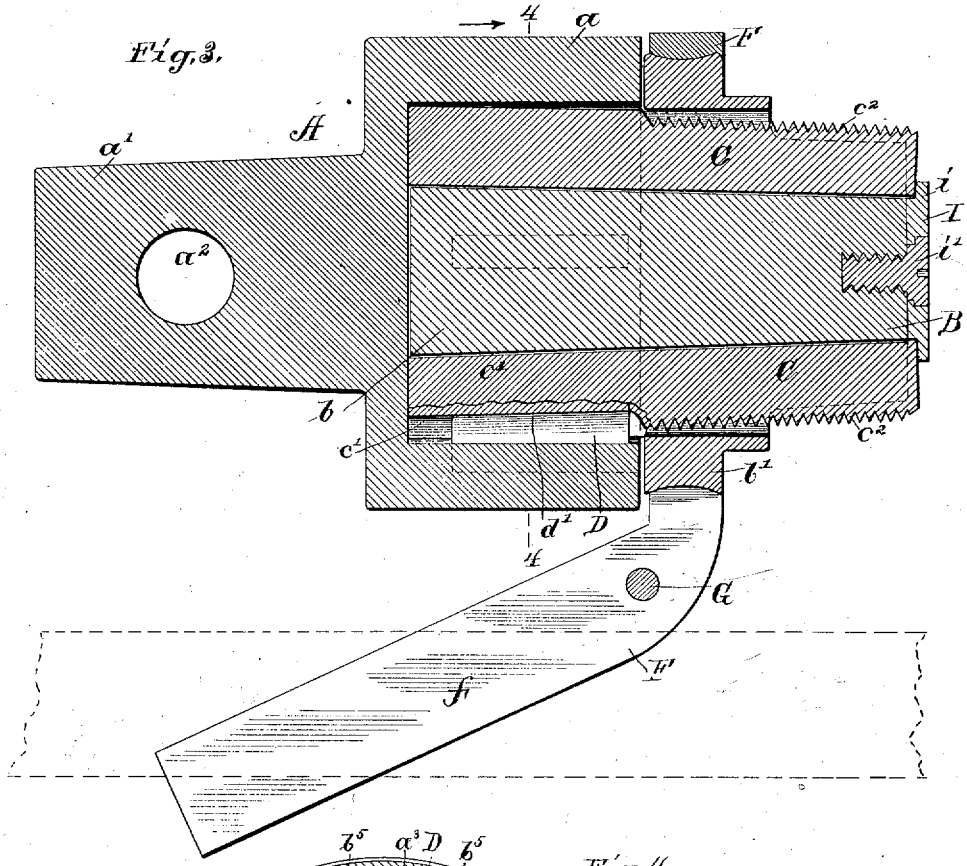
Figure 4:
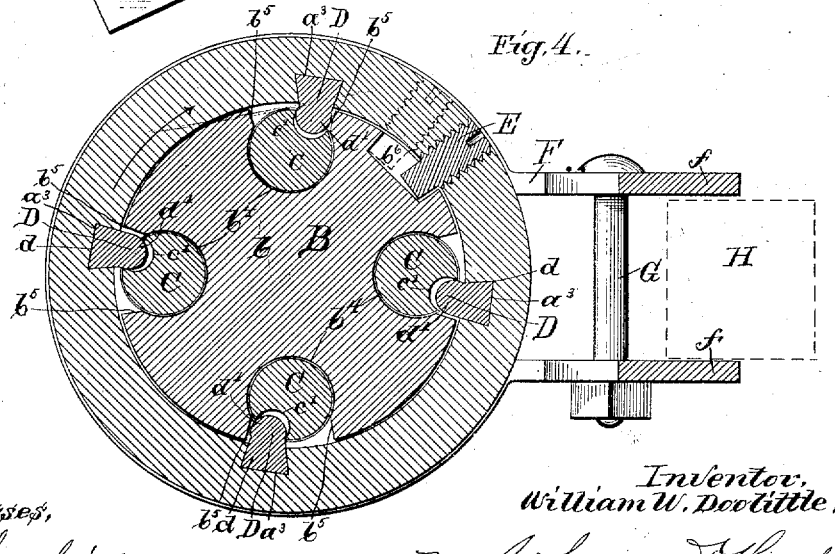
Figure 5:
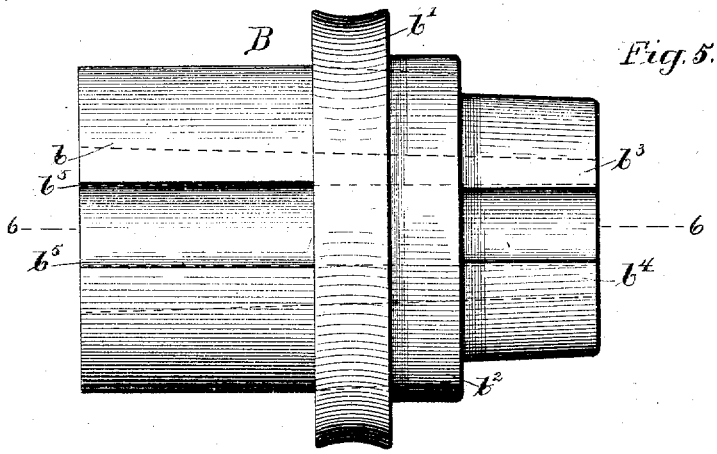
Figure 6:
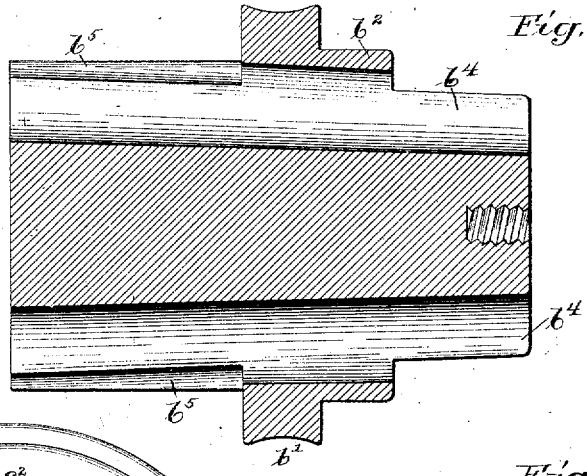
Figure 7:
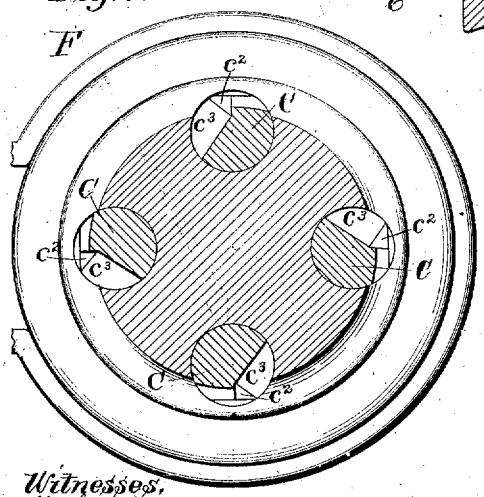

Figure 1 represents a side elevation of a tap embodying my invention; Fig. 2, a front end elevation of the same in working adjustment; Fig. 3, a longitudinal vertical section of the same, taken on the line 3 3 of Fig. 2; Fig. 4, a cross-section taken on the line 4 4 of Fig. 3, looking in the direction of the arrow and in working adjustment; Fig. 5, a side elevation of the cutter-holder detached; Fig. 6, a vertical section of the same, taken on the line 6 6 of Fig. 5; Fig. 7, a vertical section taken on the line 7 7 of Fig. 1, and Fig. 8 a side elevation of one of the cutters detached.

My invention relates to that class of taps generally known as "collapsible"—that is, in which the cutters are adjustable from their working position to a position in which they lie somewhat within their former circumscribing circle to provide for ready removal from their work and other purposes.

The invention consists in the construction and mounting of the cutters and the devices whereby the collapsing adjustment is effected.

I will now describe in detail the construction and operation of a tap in which I have embodied my invention in one practical form and the particular improvements constituting my invention, and which I desire to secure by Letters Patent, will be more definitely pointed out in the claims.

Figure 8:
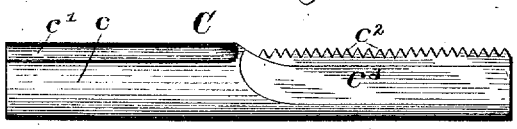

In the drawings, A represents what may be called the "main head" or "holder" of the tap, and B the cutter-head or holder, in which the cutters are mounted and which itself is mounted in the main head A. The head A is composed of a cylindrical cup $a$, at the back of which projects a stem $a'$ of much less diameter, by means of which the device is fastened to the usual mandrel, this stem being shown provided with an aperture $a^2$, by means of which the attachment is made. The cutter-head B is solid and mainly of cylindrical form, but with different diameters. The larger end $b$ of this head is adapted to fit neatly within the cup $a$ of the holder, being in length about the same as the depth of the cup. In front of this section the head is considerably enlarged to form a ring or collar $b'$, the front portion of which is cut down to make a smaller section of the collar $b^2$. Then the extreme front end $b^3$ of the head is cut down to a diameter less than the rear end section and is made slightly tapering, as seen in Fig. 1. In the surface of this cutter-head B a series of longitudinal grooves $b^4$ is cut, which are intended for the reception of the cutters, and hence in number are the same as the number of cutters desired. In the drawings four are shown. These grooves run the entire length of the cutter-head and are cut through, so as to run underneath or within the central collar $b^2$, as seen in Fig. 6. They are circular in cross-section from the bottom nearly to the surface of the head; but are cut out at the opening somewhat so as to provide shoulders $b^5$ for a little distance inward on the end sections of the head, as seen in Figs. 4 and 6, the space between which is preferably a little less than the diameter of the grooves—that is, these grooves after passing said shoulders at the entrance open out a little way on each side on the arc of a circle, which is completed in the finishing of the groove. The cutters C are constructed and adapted to be seated in these grooves in the cutter-head. They are in length the same as the length of the said head and are substantially cylindrical in cross-section, so that they can be slipped into their seats underneath the central collar on the cutter-head. The tail end $c$ of each cutter is, in fact, a cylinder of a size adapted to fit the circular grooves in the cutter-head, with the exception of a longitudinal groove $c'$ made in one side thereof, which is concave in cross-section. This groove in each cutter is in length about the same as the depth of the cup in the main head, so that when the parts are all mounted in working organization, as seen in Fig. 3, these portions of the cutters will be inclosed within the cup. Commencing about at the inner end of this groove $c'$ a depressed cutting section $c^2$ extends outward to the outer extremity of the cutter. At one side or in front of this section of cutting-teeth the cylinder is cut out to form a rather deep groove $c^3$, extending the length of the toothed section, as seen in Fig. 8, and being almost in line with the groove $c'$, while the line of cutting-teeth is almost outside of the latter.

Within the cup of the main head there is set a series of ribs or splines D, corresponding in number to the number of cutters. They are set in the interior of the cup, preferably by means of dovetail seats or grooves $a^3$ in the cup, adapted to receive a correspondingly shaped bottom $d$ of the splines, and the outer portion of the latter projecting into the cup is rounded or circular, as seen at $d'$, whereby these splines are adapted to fit the respective grooves $c'$ in the tail ends of the cutters. These ribs or splines are arranged to correspond with the grooves in the cutter-head in which the cutters themselves are mounted, so that when the said head is placed within the cup one of these ribs will project into the opening of each of said grooves, and so is received into the groove $c'$ in the cutter that is mounted in this particular seat, as seen in Fig. 4. Now the thickness of the ribs D is considerably less than the width of the openings of the grooves or recesses in the cutter-head. Evidently, then, there may be a differential movement between the main head and the cutter-head B within the limits thus provided, and it is obvious that this movement will oscillate the cutters in one direction or the other in their seats on account of the engagement of the splines with said cutters. The effect of this oscillation will be to project the cutting-teeth at the outer end of the cutter-head a little beyond the surface of said head in one position, while in the other they will be withdrawn within the said circumference, as will presently be explained. The range of this movement between the main head and the cutter-head is determined by the shoulders $b^5$. There is also a short circumferential groove $b^6$ in the cutter-head, and a screw E is set into it from the side of the cup to hold the head from movement lengthwise.

Owing to the position of the line of cutting-teeth on the cutter somewhat within the circumference of the latter, as indicated in Fig. 3, when the head A is turned back, so as to bring the stud E to the left end of the recess $b^6$, as seen in dotted lines in Fig. 4, the teeth will be turned down within the circumference of the front end of the cutter-head; but when turned in the other and working direction into the adjustment shown in full lines in Fig. 4, the cutting-teeth will be turned out, so as to project beyond the circumference of the head, as seen in Figs. 1 and 3, which is their working position, the head A being revolved for working in the direction indicated by the arrow in Fig. 4. It will be seen that this adjustment of the cutters will be effected by the differential movement between the main head and the cutter-head within the limits of the shoulders $b^5$ at the opening of the grooves and through the engagement of the splines D with the grooves $c'$ of the cutters. This movement may be obtained in different ways. In the drawings the device by which it is produced is a friction band F, which is applied to the larger circumference of the central band or collar $b^2$, the ends $f$ of which are bent outward horizontally and parallel to each other and are fastened together by a screw-bolt G. A straight stationary bar H is extended along a little outside of the tap and parallel with the axis thereof, and the fork provided by the projecting ends of the friction-band is arranged to embrace this bar. The band is tightened upon its seat by means of the bolt, so as to produce friction sufficient to hold the cutter-head stationary while the main head continues to revolve in one direction or the other during the limited period that a spline D is traveling from one side of its recess to the other; but as soon as it reaches the other side of the recess a permanent stop is formed and the two parts of the tap must travel together, the friction-band being sufficiently loose to prevent this without undue strain. The differential movement, though limited, is sufficient for the purpose of adjusting the cutters in and out, as required, these cutters being turned out into working position when the tap is revolved in the direction indicated by the arrow in Fig. 4 and turned in or collapsed when the movement is reversed, so that the tap may be withdrawn from the work, as usual. It will be noticed that only a short length of the toothed ends of the cutters is exposed, and it will be understood that in the ordinary work of tapping-machines only a short section of the cutting-teeth is brought into operation. Now with the long cutters here shown provided with a long toothed section the cutters may be used much longer than usual by simply adjusting them forward. This is accomplished by simply setting a block or blocks behind a cutter in its seat, when of course it will be thrust forward in the latter, thus bringing a new section of teeth into working position; but the cutters are held in place by passing under the central collar on the head and by a disk I, fastened to the outer end of the head and provided with a flange $i$, extending out a little over the outer ends of the cutters, as seen in Fig. 3. This disk is shown fastened to the end of the head by a screw $i'$. When the teeth are worn down, the cutters are removed and the worn sections cut off, when they are replaced in their seats and blocks of suitable size put behind them to bring the teeth into working position. It will be seen that with this provision for adjustment the cutters may be used until the entire length of the cutting-sections has been used up.

The particular device for effecting the differential movement, whereby the adjustment of the cutters is obtained, as described above, may be varied, and I do not wish to be understood as limiting myself to the particular device here shown and described. There may be changes in other particulars of construction also without departing from the main features of this invention, and such changes I contemplate in practice.

Having thus described my invention, what I claim as new, and desire to secure by Letters Patent, is—

1. In a collapsible tap, the main head A, in combination with the cutter-head B, mounted within the former and having a limited free movement therein, the cutters C, mounted in the head B in seats in which they are free to oscillate, a connecting device between said cutters and the main head, and a friction device applied to the cutter-head, whereby a limited differential movement between the main head and the latter is obtained, substantially as described.

2. In a collapsible tap, the main head A, provided with a cylindrical cup $a$, in combination with the cutter-head B, provided with circular longitudinal grooves $b^4$, the cylindrical cutter C, provided with grooves $c'$, the splines D, set in the cup of the main head and engaging with the said grooves in the cutters, and means for connecting the main head with the cutter-head, whereby a limited differential movement is permitted, substantially as described.

3. In a collapsible tap, the cutter-head B, consisting of the cylindrical section $b$, the enlarged central collar-section $b'$, and the front tapering section $b^3$, and having longitudinal grooves $b^4$ running its entire length and passing underneath the central collar, in combination with the cylindrical cutters C, seated within the said grooves and adjustable lengthwise therein, and the flanged disk I, retaining the cutters in their seats, substantially as described.

4. In a collapsible tap, the main cup-shaped head A, in combination with the cutter-head B, provided with longitudinal grooves, the cylindrical cutters C, mounted in said grooves and provided with the short longitudinal grooves $c'$, the splines D on the inside of the cup, engaging with said grooves in the cutters, the stop-stud E, arranged to play in the cross-recess $b^6$ of the cutter-head, and friction-band F, applied to the cutter-head and fixed in position by any suitable device, substantially as described.

5. In a collapsible tap, the cup-shaped head A, in combination with the cutter-head B, provided with longitudinal grooves $b'$ and short cross-recess $b^6$ and having an enlarged central collar $b^2$, the cylindrical cutters C, seated in the head B and provided with grooves $c'$ at their rear ends, the splines D on the internal surface of the cup, the stop-stud E, set into the side of the cup, and friction-band F, applied to the collar $b'$ and having its ends $f$ turned outward horizontally, and the fixed bar H, arranged between the projecting ends of the band, substantially as described.

6. In a collapsible tap, a cylindrical cutter C, provided with a section $c^2$ of cutting-teeth slightly within the circumference of the cylindrical body, and a groove $c^3$, extending the length of the said section and at the front thereof, in combination with a cutter-holder in which said cylindrical cutters are free to oscillate and mechanism whereby in the backward movement of the tap the cutters are oscillated backward out of working position, substantially as described.

7. In a collapsible tap, a cylindrical cutter C, provided with a section $c^2$ of cutting-teeth slightly within the circumference of the cylindrical body, and a groove $c^3$ extending the length of said section at the front thereof, in combination with a cutter-holder in which said cylindrical cutters are free to oscillate, and mechanism whereby the cutters may be turned backward and thus throw the cutting-teeth out of working position, substantially as described.

WILLIAM W. DOOLITTLE.

Witnesses:
ROBERT C. PAGE,
W. C. CORLIES.